United States Patent [19]

McIntyre

[11] Patent Number: 4,476,165

[45] Date of Patent: Oct. 9, 1984

[54] METHOD OF AND APPARATUS FOR MULTI-LAYER VISCOUS FLUID DEPOSITION SUCH AS FOR THE APPLICATION OF ADHESIVES AND THE LIKE

[75] Inventor: Frederic S. McIntyre, Wellesley, Mass.

[73] Assignee: Acumeter Laboratories, Inc., Marlborough, Mass.

[21] Appl. No.: 385,683

[22] Filed: Jun. 7, 1982

[51] Int. Cl.³ .............................................. B05C 5/02
[52] U.S. Cl. .................................. 427/258; 427/403; 118/411
[58] Field of Search ....................... 118/411, 412, 410; 427/356, 445, 358, 402, 258, 403

[56] References Cited

U.S. PATENT DOCUMENTS

| | | | |
|---|---|---|---|
| 2,761,417 | 9/1956 | Russell | 118/410 |
| 2,761,418 | 9/1956 | Russell | 118/410 |
| 2,761,791 | 9/1956 | Russell | 117/34 |
| 3,032,008 | 5/1962 | Land et al. | 118/411 |
| 3,206,323 | 9/1965 | Miller et al. | 118/411 X |
| 3,595,204 | 7/1971 | McIntyre et al. | 118/8 |
| 4,020,194 | 4/1977 | McIntyre et al. | 427/172 |
| 4,106,437 | 8/1978 | Bartlett | 118/412 |
| 4,277,301 | 7/1981 | McIntyre et al. | 156/446 |
| 4,299,186 | 11/1981 | Pipkin et al. | 118/410 X |
| 4,356,216 | 10/1982 | Gailey et al. | 118/411 X |

Primary Examiner—John P. McIntosh
Attorney, Agent, or Firm—Shapiro and Shapiro

[57] ABSTRACT

This disclosure is concerned with independent fluid dispensing by a multi-slot cavity nozzle with opposing zig-zag fluid path baffle-diversion operation, generating a pair of adjacent line fluid depositions upon a web moving past the nozzle, and enabling the separate but simultaneous use of adhesives and other fluid media of different characteristics and in widely flexible multi-layer coating patterns including superposed, side-by-side, spaced and other multi-layer patterns.

12 Claims, 10 Drawing Figures

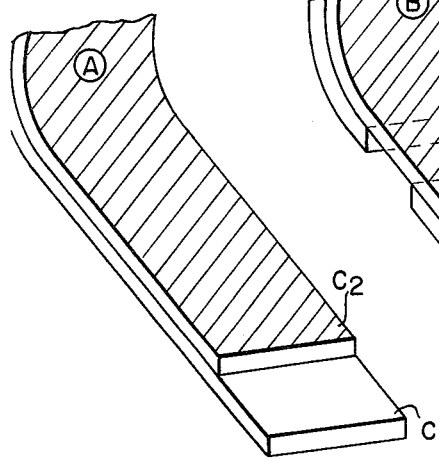
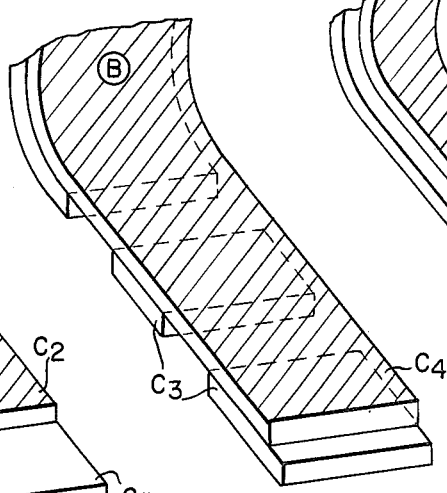
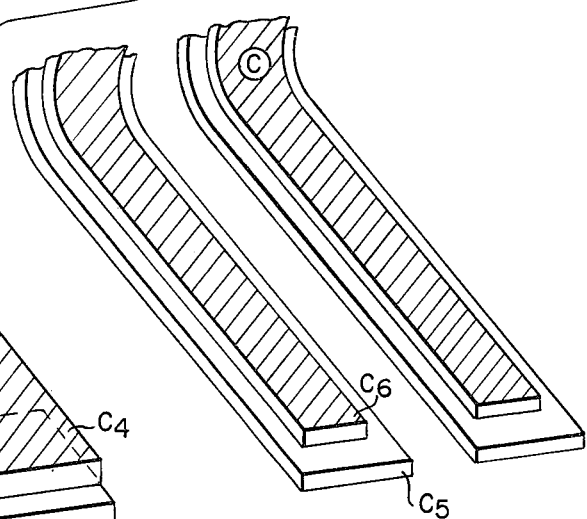
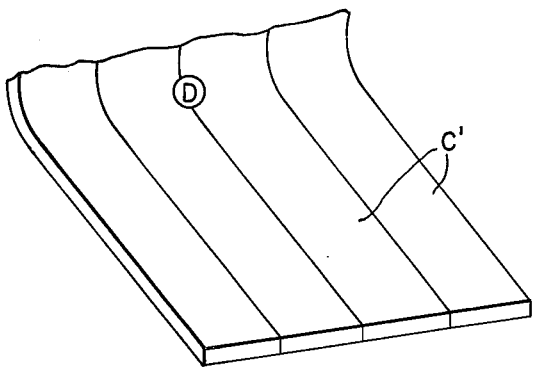
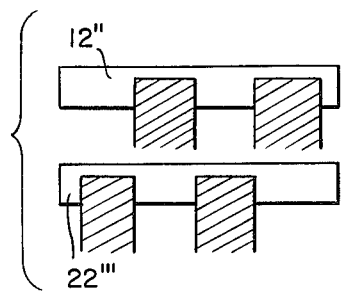
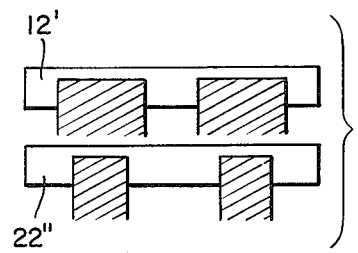

METHOD OF AND APPARATUS FOR MULTI-LAYER VISCOUS FLUID DEPOSITION SUCH AS FOR THE APPLICATION OF ADHESIVES AND THE LIKE

The present invention relates to methods of and apparatus for viscous fluid deposition, as from applicator nozzles and the like, for a wide range of viscosity fluids, including hot melt and other adhesives and the like; the invention being more particularly directed to techniques for enabling multi-layers of viscous fluids of similar or very different properties and dimensions and geometries of depositions to be deposited substantially simultaneously upon moving webs or other surfaces.

In prior U.S. Pat. Nos. 3,595,204, 4,020,194, and 4,277,301 of the assignee of the present invention, very successful nozzles for applying lines and various patterns of hot melt and other adhesives and similar fluid depositions are described which have found wide application in various industries ranging from the binding of business forms to providing controlled-pattern adhesive depositions for joining various paper and related products together as in the case of diapers and similar items, and for many other applications.

As the art has become more and more sophisticated and requirements for applicators more and more stringent, with an indicated desire for processes and apparatus that are adapted to enable wide ranges of different materials of low and high viscosities and varying properties and moduli of elasticity to be used, it has become important to provide a significant improvement in nozzles that can enable wider flexibility of use. In accordance with discoveries underlying the present invention, indeed, it has now become possible and highly practical to use a common nozzle structure for the plural or multiple layering of viscous adhesives and other fluids substantially simultaneously in superposed position, in tandem, in side-by-side relations and in other types of arrangements, and with a high degree of flexibility in terms of geometrical patterns and types of materials simultaneously usable.

The present invention thus has as a primary object the solution of these and related problems and to provide a new and improved multi-layer viscous fluid deposition process and apparatus that can be used for a wide range of variations in types of fluid, patterns and types of applications, and all with a common fluid application process and nozzle apparatus.

A further object is to provide a new and improved adhesive and similar fluid applicator particularly adapted for hot melt and radiation-curable adhesives and similar coatings, and of more general applicability as well.

Other and further objects will be explained hereinafter and are more particularly delineated in the appended claims.

In summary, however, from one of its broader aspects, the invention embraces a method of multi-layer viscous fluid deposition upon a moving web or the like, that comprises, pumping fluid synchronously with the web speed transversely into intermediate inlet regions on one side of each of a pair of substantially parallel opposed narrow longitudinal slot cavities to expand the fluid longitudinally along each slot without substantial transverse expansion; projecting the longitudinally expanded fluid in the pair of slot cavities transversely outwardly toward one another and against opposite sides of baffle means to divert the fluid and exit the same through a pair of adjacent openings each disposed on the opposite side of its slot cavity from the inlet region, so that the fluid on opposite sides of the baffle means is directed in zig-zag paths towards one another; and varying the width of the said openings to increase or decrease the velocity of the exiting fluid to adjust for the varying shearing action by the web on fluids of widely different viscosity in order to maintain a continuous and uniform deposition without discontinuity. Preferred details and best mode embodiments are hereinafter presented.

The invention will now be described with reference to the accompanying drawings

FIG. 1 of which illustrates an isometric view, with parts shown expanded to show detailed construction of a preferred embodiment utilizing plural in-line slot cavities for the purpose of enabling lines, strips, patterns or curtains of fluid deposition on web materials and the like;

FIGS. 5A, B, C and D are isometric views of different types of deposition attainable with the process and nozzle of the invention; and FIGS. 6A and 6B respectively illustrate opposing shim constructions for the nozzle of the invention in order to produce the depositions illustrated in FIGS. 5B and 5C, respectively.

Figure 1:
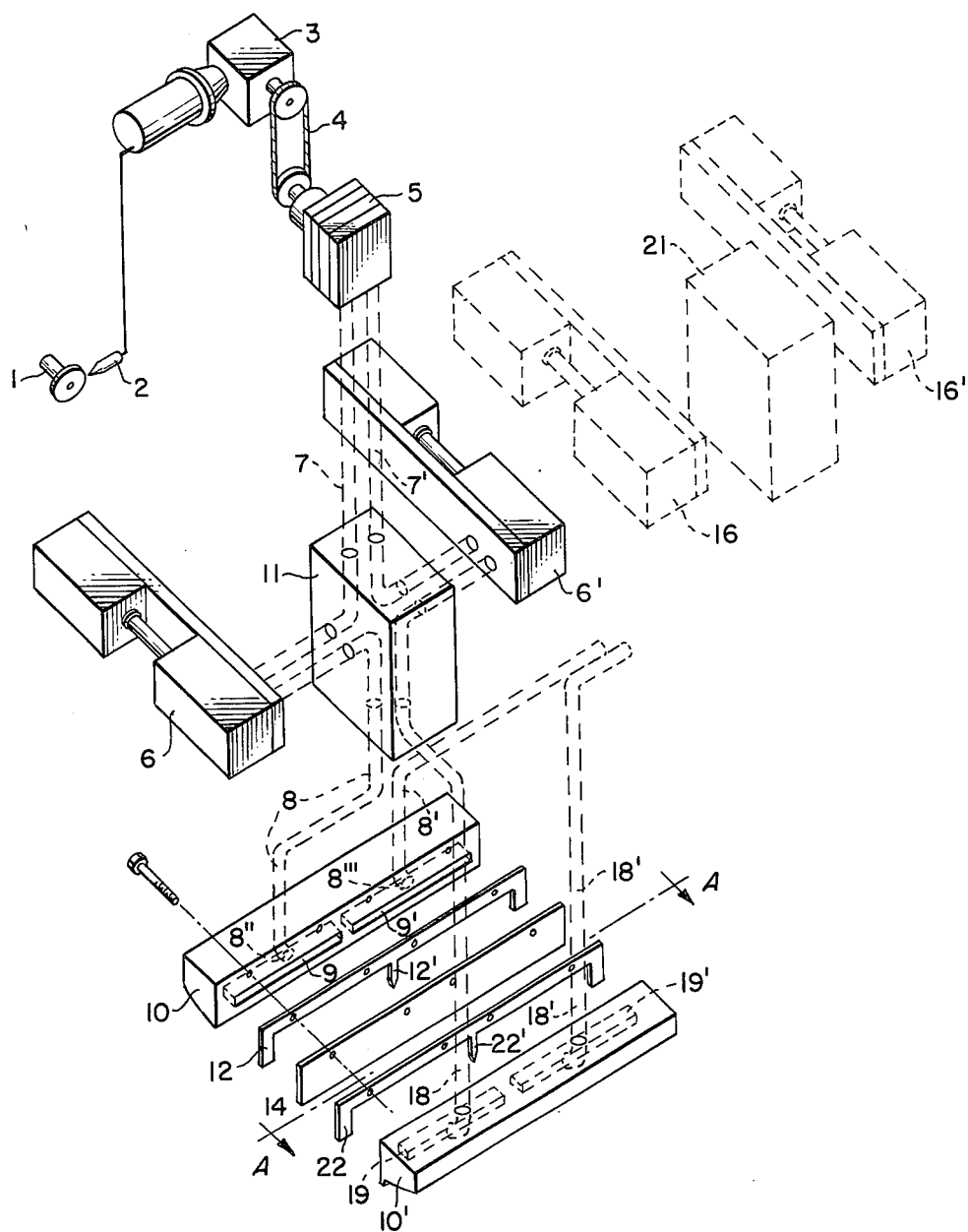

Referring to FIG. 1, the system will now be described in connection with a wide-line or strip applicator utilizing opposing in-line pairs of narrow longitudinal slot cavities 9-9', 19-19' in the applicator or dispenser. In the system operating in accordance with the process of the invention, a control signal is generated by way of a process machine signal gear 1 adjacent to a magnetic pickup 2 that provides a control pulse to a digital motor drive package 3 which mechanically drives a positive displacement metering pump 5, as, for example, of the type described in said patents, by the drive 4. The metering pump 5 contains two positive output discharges 7 and 7'. The output discharges 7 and 7' deliver fluid through a manifold block 11 individually to their respective individual extruder valves 6 and 6', with the valves in turn delivering individual fluid flow by way of respective inlets 8-18, extending transversely (initially substantially vertically and then at an inclined angle as at 8", for example) at one side into intermediate inlet regions of one of the pair of adjacent in-line narrow longitudinal slot cavities 9-19 of composite multi-nozzle coating head, nozzle or applicator 10-10'. A similar manifold block 21 and pair of extruder valves 16 and 16' (shown dotted) enable similar feeding via inlets 8' and 18' of the other of the pair of in-line longitudinal slot cavities 9'-19'. In this example, each two-discharge metering pump provides fluid to a total of two cavities for distribution within the nozzle.

Pattern shims 12 and 22 are respectively located over the respective cavities 9-9', 19-19', with longitudinal slot openings therein aligned as desired with the cavity slot openings to provide the desired coating pattern, as later explained. Opposite sides of an intermediate common nozzle separator plate or baffle 14 close off the pattern shims 12 and 22 and act as a separator between the adjacent and opposing parallel nozzle halves 10 and 10'.

Figure 2:
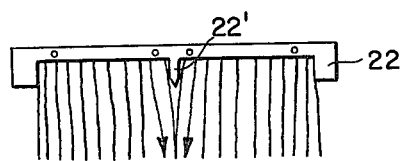
FIG. 2 is a section taken along the direction of the line A—A of FIG. 1, illustrating the converging of exiting fluid from the plural in-line slot cavities.
Figure 4:
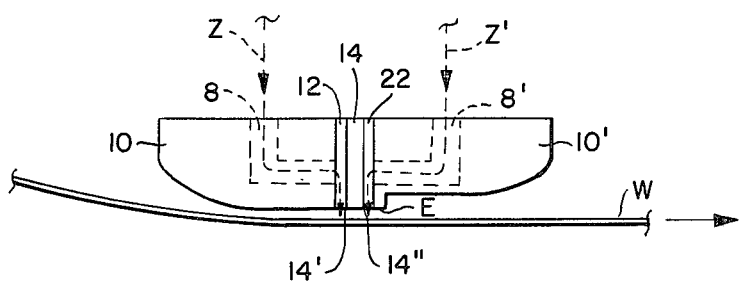
FIG. 4 is a transverse section of the applicator of FIG. 3, assembled together, showing the finished nozzle assembly.

When assembled, as shown in FIG. 4, the composite nozzle 10-10' provides for fluid being directed in opposite or opposing directions in zig-zag paths Z and Z', with the fluid fed in at 8-8' and 18-18' being respectively longitudinally expanded with negligible transverse expansion in longitudinal slots 9-9' and 19-19' and then respectively projected transversely to the right against the left-hand wall of baffle 14 and to the left against the right-hand wall of baffle 14. The respective fluid paths are thus directed and exit independently through a pair of adjacent nozzle exit openings 14' and 14" displaced on the opposite side of the slot cavity from the inlets and in parallel upon a web W or other surface moving past the nozzle openings and shearing the fluid emitted therefrom at edge E, with the fluid pumping being synchronous with web line speed as described in said patents. Nozzle exit openings 14' and 14" are spaced along the direction of movement of the web (by baffle 14) so that fluid is emitted from the nozzle exit openings separately. The width of the openings and thus the velocity of the exiting fluid is controllable—increased or decreased—by the thickness of the shims 12 and 22; and the central shim downward projection, 12' or 22' as shown at 22' in FIGS. 1 and 2, serves to converge the exiting fluid curtains from in-line slots 19 and 19' to form a continuous coating.

Through this kind of multi-nozzle construction, fluids of the same or different properties, viscosities, etc. may be simultaneously layered upon the web or other surface W, providing the ability both to pattern-coat out of individual respective nozzle cavities as well as to use different fluids being delivered by different metering pumps, wherein the fluids pass out of contact with adjacent fluid systems—all in the same nozzle.

Figure 3:
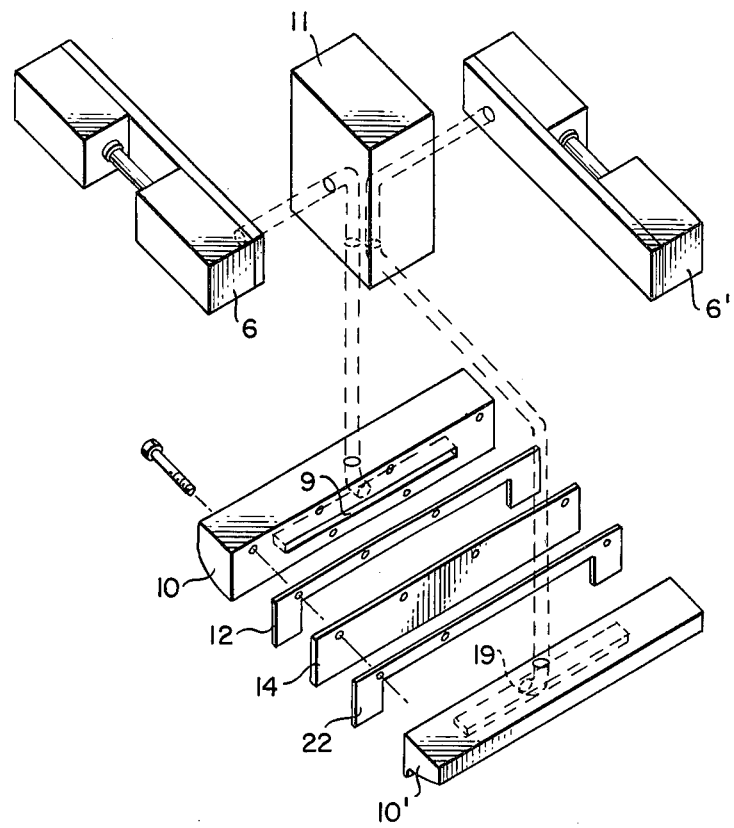
FIG. 3 is a view similar to FIG. 1 of a modified opposing-flow multi-layer fluid applicator of the invention utilizing single rather than plural in-line slot cavities.

If a simpler system of less versatility is desired, single slots instead of pairs 9-9' may be used as illustrated in the multi-nozzle system of FIG. 3.

Typical products producable for the converting industry by the multi-layer nozzle of the invention are shown by FIGS. 5A, B, C and D. In FIG. 5A, superposed coating layers $C_1$, $C_2$ are deposited, such as a heat-reactivatable coating $C_2$ applied on top of a base coating $C_1$, from the respective nozzle openings 14" and 14'. Such coatings are dry to the touch at room temperature, but upon reheating, the heat reactivatable-coating on top of the base coating blends and becomes permanently sticky. Such an application is used, for example, in supermarket stores whereby labels are dispensed through a computerized printing machine which automatically weighs the produce and upon command prints the label and at the same time applies heat to the back side for generating a permanently sticky coating for affixing to the produce. The same application can use cross-linking coating materials which can be applied on top of a base coating for obtaining higher performance properties than conventional thermal plastic adhesives offer. Likewise, the same nozzle design can apply two extremely light coatings of the same material so as to provide a hermetically or liquid barrier coating as of polyethylene for such purposes as juice or milk cartons and the like. The quantity of polyethylene used today in milk cartons and juice cartons is excessive in contrast to the reductions in coating weights enabled by the multi-layer technique of the invention.

In the pattern of FIG. 5B, the coating $C_3$ of the base material of nozzle section 10 is shown as an intermittent but programmable registered pattern; whereas the second coating from nozzle section 10' is a continuous over-coat $C_4$ for the purpose of shielding the base coating. By utilizing the intermittent extruder valve 6-6' (FIG. 1) programmed in sequence with the adjacent extruder valve 16-16' for the continuous coating, deposits can in fact be one on top of each other with registered patterns.

In the deposition of FIG. 5C, on the other hand, two different width stripe patterns $C_5$-$C_6$ are superposed in parallel-spaced rows, producible by the modified shims 12' and 22" of FIG. 6B, having shim openings of different dimensions than the cavity slot openings. Each layer may be of the same material, as for certain price marking or tape-type products wherein it is desirable to have heavier coatings in the center and lighter coatings on the edge, or the reverse, as to provide removability of a price marking label or portion at the supermarket cash register system.

In the deposition pattern of FIG. 5D, parallel coatings C' adjacent to each other are illustrated, producible by the modified shims 12" and 22''' of FIG. 6A. If desired, cavity 10 may deposit a permanent adhesive dispensed in a fixed pattern out of opening 14', and cavity 10' may deposit a different material, providing the ability to introduce two different fluids for obtaining different proportions of coating weight or different physical properties and performance.

Further modifications will also occur to those skilled in this art and all such are considered to fall within the spirit and scope of the invention as defined in the appended claims.

What is claimed is:

1. A method of multi-layer viscous fluid deposition upon a moving web, that comprises, pumping fluid synchronously with the web speed transversely into intermediate inlet regions on one side of each of a pair of substantially parallel opposed narrow longitudinal slot cavities to expand the fluid longitudinally along each slot cavity laterally of the direction of movement of the web without substantial transverse expansion; projecting the longitudinally expanded fluid in the pair of slot cavities transversely outwardly toward one another and against opposite sides of baffle means that extends laterally of the direction of movement of the web, to divert the fluid to and through a pair of adjacent exit openings spaced along the direction of movement of the web and each displaced on the opposite side of its slot cavity from the inlet region, so that the fluid on opposite sides of the baffle means is directed in zig-zag paths towards one another and through the respective said spaced openings onto the moving web; and varying the width of the said openings along the direction of movement of the web to increase or decrease the velocity of the exiting fluid to adjust for the shearing action by the web for fluids of widely different viscosities in order to maintain a continuous and uniform coating deposition, without discontinuity, exiting separately at substantially the same time from both of said openings.

2. A method as claimed in claim 1 and in which fluid materials of different properties are applied to the slot cavities.

3. A method as claimed in claim 1 and in which the fluid coatings of the pair of openings are superposed.

4. A method as claimed in claim 1 and in which the fluid coatings from said openings are disposed side-by-side.

5. A method as claimed in claim 1 and in which the fluid coatings are deposited in different widths.

6. A multi-layer fluid nozzle applicator for depositing viscous adhesives and the like upon a web moving past the nozzle, having, in combination, a pair of opposing transversely spaced longitudinal slot cavities of narrow width; inlet means connected intermediate each cavity for injecting fluid transversely into the slot cavity on one side thereof to enable longitudinal expansion thereof along the slot cavity with negligible transverse expansion; pump means connected to the inlet means for providing continuous flow of fluid materials synchronously with the web speed; a pair of shim means provided with openings aligned with the slot cavities, respectively, and of predetermined thickness; baffle means abutting the shim means at opposite sides of the baffle means, respectively, for diverting the fluid expanded in each slot cavity and transversely passed through the shim means opening on the other side of the slot cavity from the inlet means, said shim means openings terminating in a pair of adjacent, parallel nozzle exit openings on opposite sides of the baffle means, respectively, and spaced along the direction of movement of the web; and means for enabling changing of the said predetermined thickness of the shim means to increase or decrease the velocity of fluid exiting from said nozzle exit openings for separately depositing layers of relatively low and high viscosity fluids as desired on the web.

7. A multi-layer fluid nozzle applicator as claimed in claim 6 and in which the pattern of layers deposited is controlled by the size of the openings in the shim means and the slot cavity openings.

8. A multi-layer fluid nozzle applicator as claimed in claim 6 and in which the pump means generates intermittent flow in one of the slot cavities and continuous flow in the other.

9. A multi-layer fluid nozzle applicator as claimed in claim 6 and in which the layers deposited through the said pair of adjacent nozzle openings are superimposed upon the web.

10. A multi-layer fluid nozzle applicator as claimed in claim 6 and in which the shim means are adjusted to deposit the layers through the said pair of nozzle openings side-by-side upon the web.

11. A multi-layer fluid nozzle applicator as claimed in claim 6 and in which the layers deposited through said pair of nozzle openings are of different stripe width.

12. A multi-layer fluid nozzle applicator as claimed in claim 6 and in which each slot cavity comprises a plurality of in-line cavities.

* * * * *